March 5, 1957  J. M. ANDREAS ET AL  2,783,678
PHOTOGRAPHIC CONTRAST CONTROL SYSTEM
Filed Oct. 2, 1951  4 Sheets-Sheet 1

Inventors
John M. Andreas
Donald H. Kelly
by Roberts, Cushman & Grover
Att'ys.

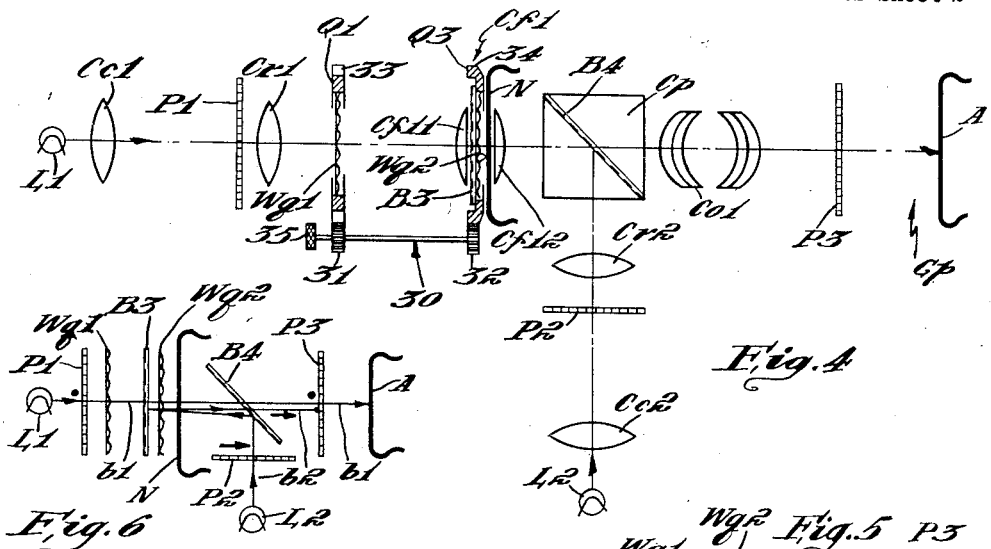
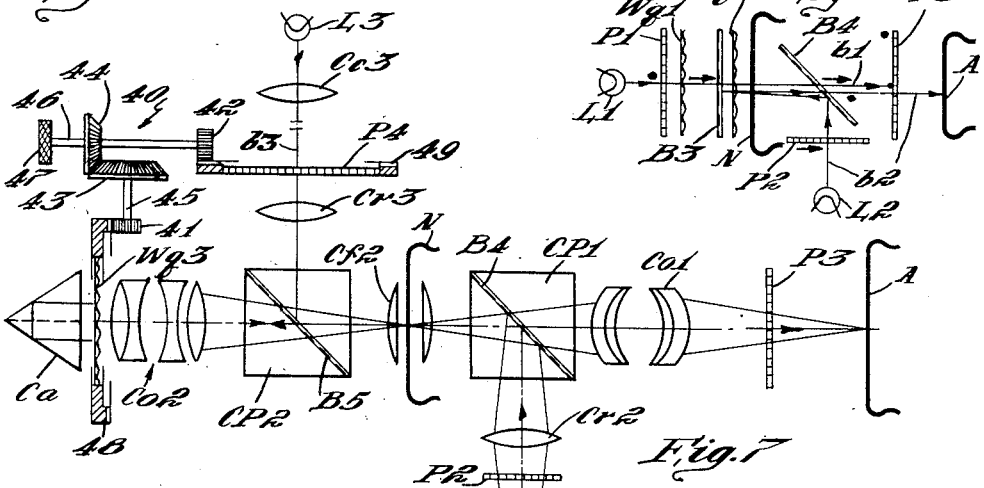
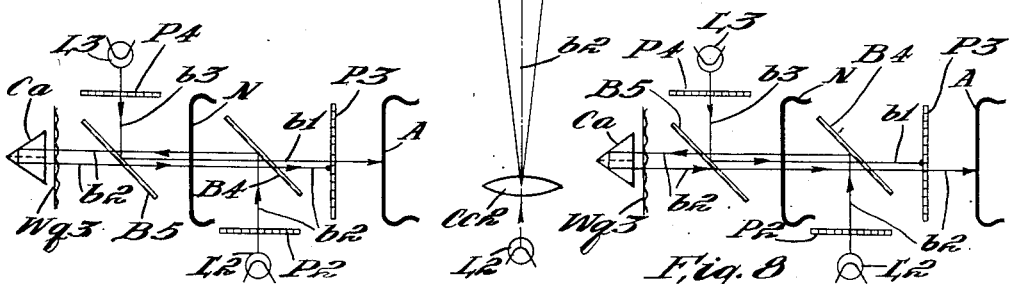

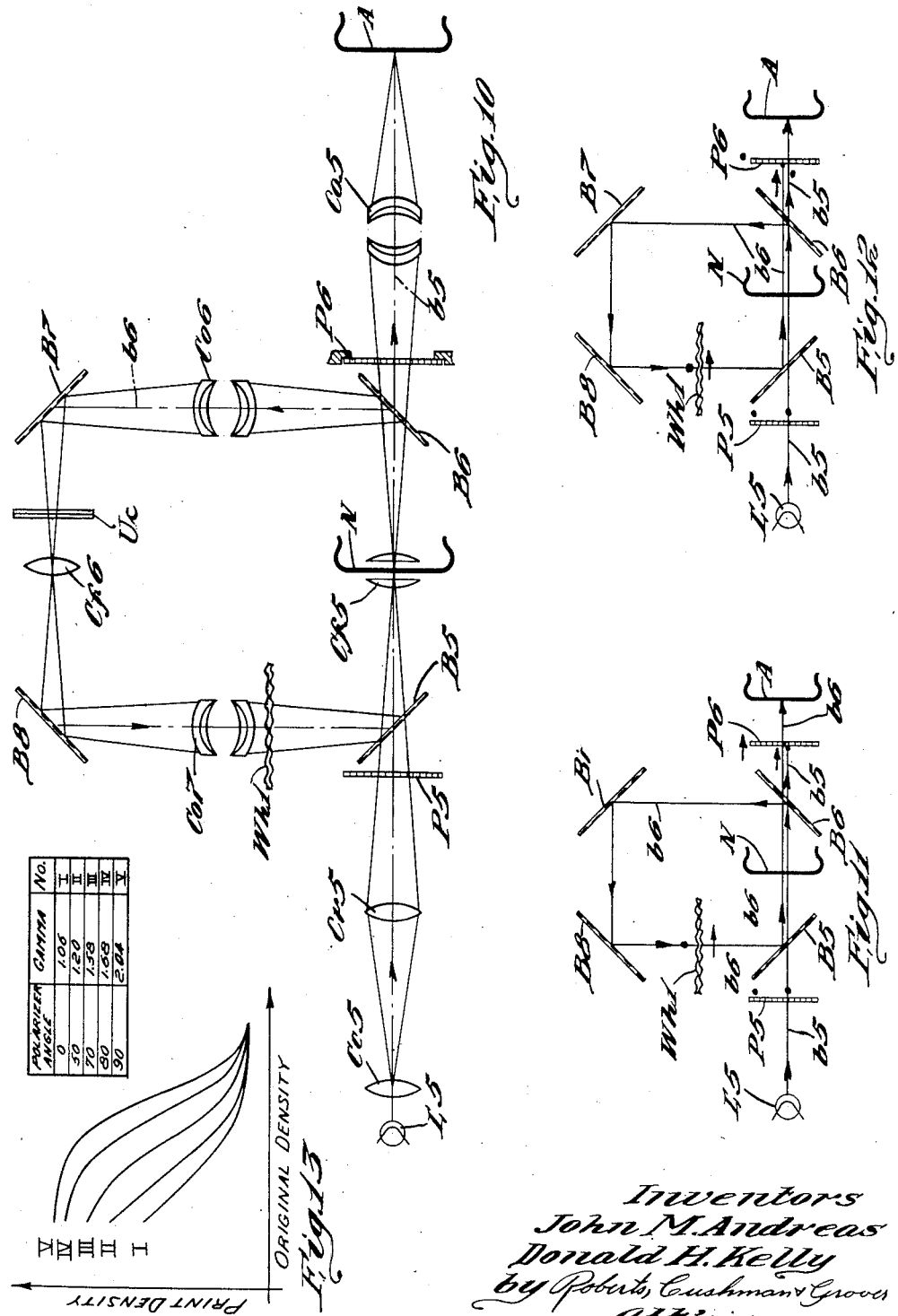

March 5, 1957 J. M. ANDREAS ET AL 2,783,678
PHOTOGRAPHIC CONTRAST CONTROL SYSTEM
Filed Oct. 2, 1951 4 Sheets-Sheet 4
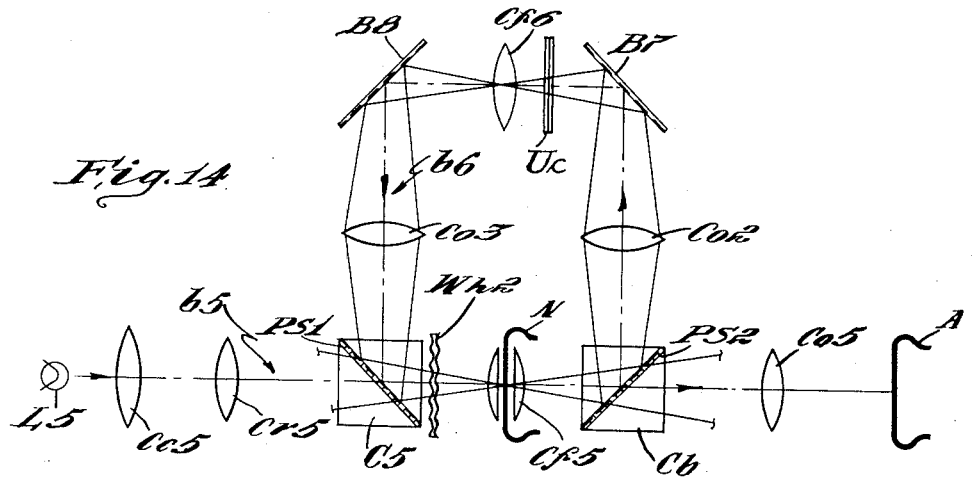
Fig.14
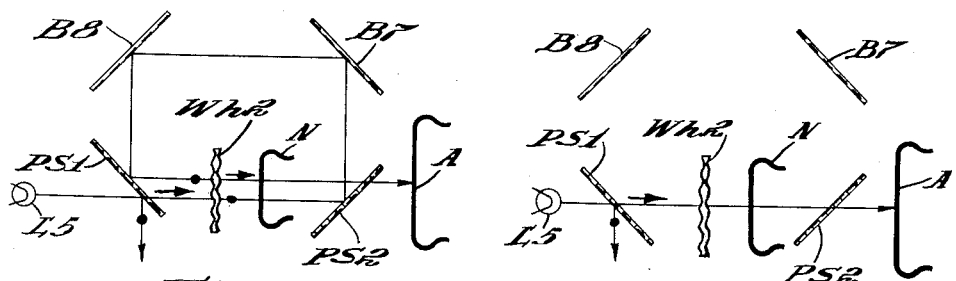
Fig.16  Fig.15
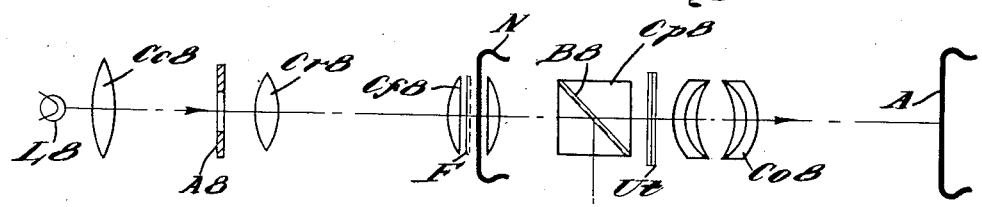
Fig.17
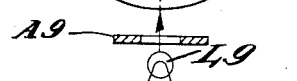
Inventors
John M. Andreas
Donald H. Kelly
by Roberts, Cushman & Grover
Att'ys.

United States Patent Office 2,783,678
Patented Mar. 5, 1957

2,783,678

PHOTOGRAPHIC CONTRAST CONTROL SYSTEM

John M. Andreas, Pasadena, and Donald H. Kelly, Los Angeles, Calif., assignors to Technicolor Motion Picture Corporation, Hollywood, Calif., a corporation of Maine Application October 2, 1951, Serial No. 249,328

23 Claims. (Cl. 88—24)

The control of contrast presents one of the most important problems in the photographic arts since it affects and must be considered at practically every stage of the photographic process. The present invention deals with a new system of contrast control, and in order to facilitate the understanding of the following descriptions and operational explanations, the herein used terms relating to contrast concepts will first be defined and the problem solved by the invention generally discussed.

The term "record" is herein used for tangible photographic reproductions such as in exposed silver halide, developed silver, or dye, as distinguished from optical "images" producing such records, or perceptual images derived from records.

The characteristic properties of a given film processed in a given manner are usually studied by means of a curve wherein the optical density $D$ of a given area of the developed film record is plotted against the logarithm of the exposure $E$ for the same area. The optical density $D$ is defined as the logarithm of the reciprocal of the optical transmission $T$ of the film, and the exposure $E$ is defined as illumination intensity multiplied by illumination time. Generally speaking, a portion in the central region of this curve can be approximated by a straight line, and the slope of this straight line portion is referred to as gamma $G$. Since the exposure units are merely relative, the equation of this straight line is of the form $D = G \log E$. Assuming an optical system capable of uniformly illuminating the film, units of object brightness $B$ may be substituted for exposure units, in which case the gamma serves to express the ratio of object contrast to photographic contrast. Photographic contrast is normally the maximum density difference $D_2 - D_1$ which can be obtained from the straight portion of the curve. The brightness ratio $B_2/B_1$ of the maximum object contrast log $B_2$ — log $B_1$ = log $B_2/B_1$ (corresponding to the density range $D_2 - D_1$) is referred to as the latitude of the film.

Any change of gamma in the course of a process must represent a proportional density change, with the increase or decrease in density of a given elementary record area depending on the originally given density of that area. A uniform density, optically added overall, merely serves to translate the curve, whereas a uniform exposure added overall introduces an exponential non-linearity which spoils the desirable straight line configuration of the curve. Both changes have their uses, but neither can be employed for accurately altering the contrast. Heretofore, only these undesirable overall density or exposure changes could be performed optically, so that true variation of contrast has been exclusively a problem of photographic chemistry.

For example in the case of motion picture practice, the making of a perfect print from a long negative roll consisting of many scenes spliced end-to-end, usually requires scene-to-scene control of both density and contrast of the print. Scene-to-scene control of density can be provided in the course of printing by varying the amount of light used for printing each scene, as required to establish a latent record which will develop to give a print of the desired density. Overall control of the contrast for the whole roll can be obtained by varying the duration of development, but scene-to-scene control of contrast could be provided in the past only by the expensive and time consuming expedients of first printing a master positive from the negative roll, thereupon printing from the master a separate duplicate negative for each scene requiring special treatment, developing these various duplicate negatives for different lengths of time as required to get the desired contrasts, then splicing the duplicate negatives back into a single roll in proper continuity, and finally printing the positives from the duplicate negative which is free from scene-to-scene contrast errors. Obviously this procedure has many disadvantages which, in addition to considerably increased cost and time delay, include the accumulation of dirt and scratches due to handling the extra films, and the degradation of tone rendition and definition which always accompany copying processes.

Another solution based on photographic chemistry employs photographic printing emulsions which respond with a varying inherent gamma to printing light of different colors; emulsions of that type are for example described in Patent No. 2,044,864. With these emulsions it is possible to vary the contrast during the printing process by modifying the light with the most suitable filter from a graded series. This method is of limited value in color printing processes. While it can be used with a variable color light source for printing a monochrome record onto photographic material having two sensitivity bands of unequal contrast characteristics, it is impractical for reproducing conventional types of three color films since the number of sensitivity bands required becomes then excessive. At best it is still an essentially chemical rather than an optical gamma variation, and subject to the above mentioned disadvantages of chemical control.

In addition to the above limitations, the existing methods of contrast control are incapable of producing continuous contrast change during a particular scene, which is highly desirable in certain instances.

It is one of the main objects of the present invention to provide an exclusively optical method for controlling the contrast of records printed from given photographic records, this contrast control being correctly based on proportional density change as outlined above. This optical contrast control can be accomplished in definite steps of adjustment or continuously; in the latter instance it is possible to maintain constant overall exposure values.

Another object of the invention is to provide a system in which a negative of gamma $G_1$ can be printed in the normal manner to provide a positive of gamma $G_2$ when no change of contrast is intended apart from that difference between $G_1$ and $G_2$ which depends upon the characteristics of the two emulsions, but which system permits further, through adjustment of elements of an optical printing apparatus, alteration of the resulting positive gamma to a value $kG_2$ without any change in the chemical process, $k$ defining the desired amount of gamma change. This object can be formulated from the point of view of an unvarying positive film by stating that the gamma of the negative is effectively increased or decreased to $kG_1$ by means of the optical system. It will be understood that the terms "negative" and "positive" as herein used designate primarily the photographic derivation or printing of one from the other, and that either, or both, may be a positive or negative rendition of an object in the colloquial meaning of these words, having also in mind reversal and direct positive processes.

A further object of the invention is to provide an optical system capable of adding to or subtracting from the density of each area of a record, such as a negative, printed with that system, an amount which is a function of its original density. Referring to the above definition of optical density, this object can also be stated as a technique which raises the transmission $T$ of each elementary record area of the negative to the power $k$. For example, apparatus according to the invention is able to provide a single negative having the visual effect of two identical negatives placed in registered contact and viewed by transmitted light, when they will appear to have twice the contrast of either negative viewed individually, corresponding to the squares of elementary transmissions $T$ of a single negative. However it should be noted that the solution of this object goes beyond that corresponding superposition of two or more negatives, since the use of several negatives either in contact or with one optically imaged on the other, necessarily introduces multiple printing when continuously variable contrast control is required, the density of at least one of the negatives requiring variation in order to approximate contrasts intermediate G and corresponding to $T$ and $T^2$.

Other objects are to provide a working system or technique of the type outlined above, including a printing method as well as apparatus for carrying out this method, which system permits purely optical contrast control with comparatively simple means and moderate loss of light, to provide such a system which is adaptable to the practical working conditions inherent in black and white as well as color photography, and to provide such a system which permits in the field of color photography individual contrast control of selected color aspect components.

In accordance with the present invention, a record in a light transmitting layer (such as the emulsion layer of a negative film) is optically printed with increased contrast on a light sensitive emulsion (such as the raw film for a positive), by illuminating one side of the record by directing once transmitted light emerging one the other side of this layer a second time through the same record, and by imaging the record with the twice transmitted light on the light sensitive emulsion, thus providing contrast adjustment which is in effect a non-uniform change of the relation between the densities of corresponding elementary areas of the original (such as the negative) and the copy (such as the positive), this change being essentially a function of the densities of respective areas of the record.

In another of the broader aspects of the invention the contrast relation can be continuously adjusted by combining exposures with light beams that pass, with aid of directionally differentiating surfaces, the original a different number of times, and by adjusting the overall exposure effect of one or both means by suitable means such as shutters including polarizing and polarization discriminatory systems, for regulating effective light intensity; while the contrast modification effected by each individual beam is approximately defined by an integral number, the total effect can thus be continuously adjusted.

In a more specific aspect of the invention, multiple passage through a record of an image carrying beam alone or together with another beam is effected by means of an optical system for directing the once transmitted beam, emerging from the record to be copied, back through the record whereupon it is imaged on the light sensitive emulsion. The selection of optical systems for this purpose may for example be based on the light dividing properties of partly transparent reflectors alone or in combination with devices for reversing a light beam, such as totally reflecting prisms or fluorescent screens.

According to another important feature of the invention, beam deviating or splitting systems, or both, are combined with elements that respond to or affect some specific characteristic of light such as spectral range or polarization properties; such arrangements permit independent control of two image carrying light beams as well as conjoint control. According to another related aspect of the invention, such conjoint control involving coupled polarizing and polarization rotating elements provides for continuous contrast adjustment while the overall exposure effect is maintained essentially constant.

In a particularly important embodiment, the polarizing as well as light beam dividing properties of surfaces coated with thin layers of appropriately selected media and dimensions are utilized in combination with polarization rotating elements, such arrangements providing continuously adjustable optical contrast control in an especially efficient and simple manner.

Further features of the invention are possibilities of differentially controlling the contrast properties of images of different spectral ranges by inserting appropriate color filters in the paths of one or several of the above mentioned beams of contrast control accompanied by favorable modification of the characteristic relation of exposure and resulting record density values, and of operation of apparatus according to the invention having several independent light paths with a single light source.

Other objects, aspects and features will appear, in addition to those contained in the above statement of the nature and substance including some of the objects of the invention, from the herein presented exposition of its basic theoretical principles, and from the following description of several typical practical embodiments thereof illustrating its novel characteristics. This description refers to drawings in which Fig. 1 is a diagram illustrating the method and apparatus according to the invention;

Fig. 4 is a diagrammatic view showing a practical embodiment of the system according to Fig. 1;

Figs. 5 and 6 are simplified diagrams explaining the operation of the system according to Fig. 4;

Fig. 7 is a diagrammatic view showing an embodiment with a totally reflecting prism instead of a transparent reflector in the twice-through beam;

Figs. 8 and 9 are simplified diagrams explaining the operation of the system according to Fig. 7;

Fig. 10 is a diagrammatic view showing an embodiment with loop shaped twice-through beam;

Figs. 11 and 12 are simplified diagrams explaining the operation of the system according to Fig. 10;

Fig. 13 is a graph indicating the nature of contrast adjustment provided by a system according to Fig. 10;

Fig. 14 is a diagrammatic view showing a further embodiment somewhat similar to that of Fig. 10 but employing polarizing semi-reflectors;

Figs. 15 and 16 are simplified diagrams explaining the operation of the system according to Fig. 14; and Fig. 17 is a diagrammatic view showing an embodiment which employs a fluorescent layer as beam deflecting or reversing element.

As indicated above, the present invention involves optical systems which are capable of increasing the effective gamma of a photographic record. For example, a system wherein the same beam of light travels through a negative twice before being imaged on the raw film for a positive, produces an effect that is equivalent to a single travel exposure through two similar, superimposed negatives. Provided that the image is correctly magnified, and upon its return focused sharply and registered accurately on the single negative, the effect of such double travel exposure is a double-density system in the sense initially explained herein, with $k=2$. Intermediate gamma values can be achieved by additive mixture of integral coefficient gamma modifications which are individually adjustable within a single exposure.

Figure 1:
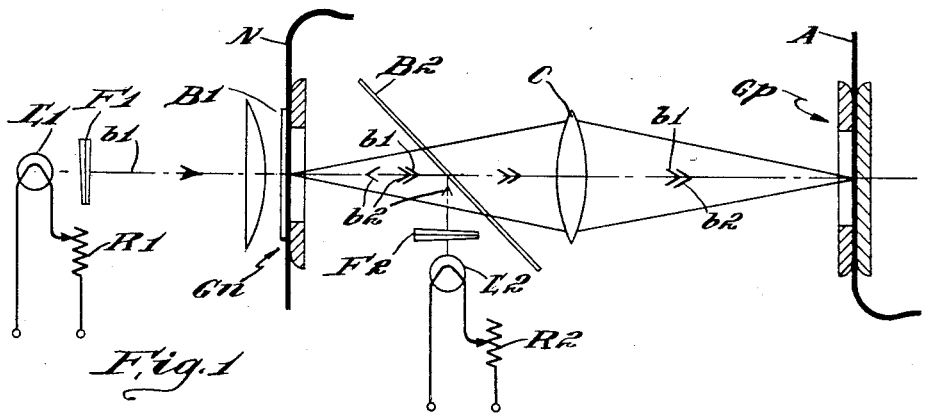

For the purpose of illustrating the general principle of the invention, a simple printer constructed in accordance with these principles, and its performance will first be described. As shown in Fig. 1, this printer has two light sources L1 and L2 capable of independent control by means of rheostats R1 and R2. The negative N is confined within and passes through a negative film gate Gn and is imaged by a lens system C on the raw film A in a positive film gate Gp also of usual construction. The negative gate Gn is generally speaking of conventional design, but incorporates a partially transmitting reflector such as a half silvered mirror plate B1. Intermittent film movements and other mechanical details such as registering devices of both film gates are conventional and therefore omitted from the drawing. Another transmitting reflector B2 is arranged obliquely to the projecting beam, between film gate Gn and copying lens C. A light beam b1 from the first light source L1 passes by way of B1 through the negative N and by way of B2 to lens C which projects on film A an image having a certain contrast, defined by record N. Light from L2, indicated at b2, is reflected at B2, passes through the negative N in the opposite direction to that from L1, and is partly reflected by transparent reflector B1. The reflected light of b2 then passes through the negative N a second time, is partly transmitted by B2, and then projected as an image of double normal contrast on film A.

Figure 2:
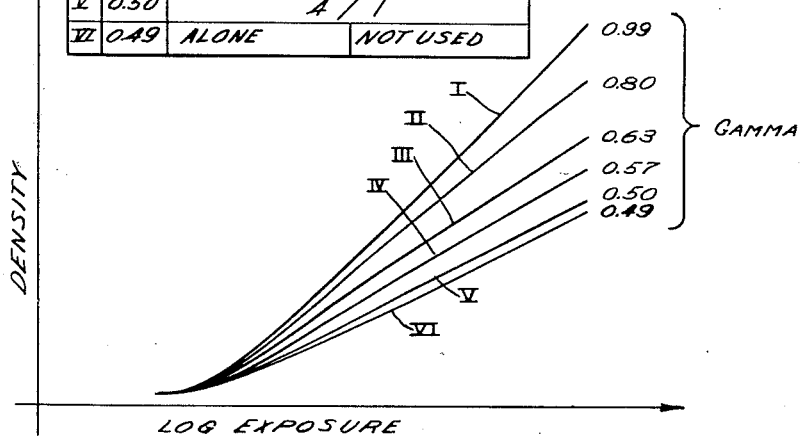
Fig. 2 is a graph indicating the nature of contrast adjustment provided by the invention.

The image provided by the system according to Fig. 1 furnishes controllable amounts of both "once-through" and "twice-through" light, so that purely optically controlled variable-contrast printing can be carried out by varying the relative amounts of light from the respective sources L1 and L2. Fig. 2 tabulates, and graphically illustrates sensitometric curves in terms of apparent negative gamma produced by various mixtures of image-brightness proportional to the transmission and the square of the transmission respectively, of the original. The table indicates the ratios of once transmitted (corresponding to T) and twice transmitted (corresponding to $T^2$) light, and the curves are correspondingly numbered. It will be noted that in this example the gamma value 0.49 corresponding to a conventional once through exposure, represents the normal value.

Figure 3:
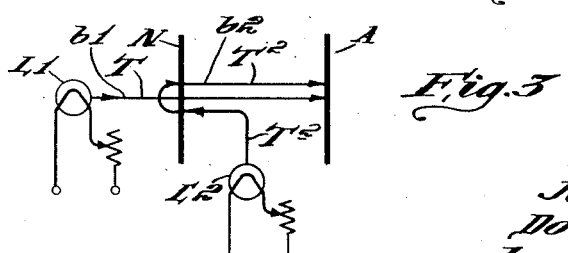
Fig. 3 is a simplified diagram explaining the operation of systems according to Fig. 1.

The diagram Fig. 3 clearly indicates the singly and doubly transmitted beams b1 and b2 corresponding to T and $T^2$ respectively, and the possibility of individual regulation of the light sources L1 and L2, such as by rheostats R1 and R2, or continuously variable wedge filters F1 and F2 shown in Fig. 1. In this manner any desirable ratio $T/T^2$ and hence any desirable gamma G can be obtained, in the range between normal and twice normal.

It will be noted that, while both single beam relations I and VI are essentially linear, a slight downwardly concave curvature is introduced into those of the intermediate double beam printings. This non-linearity can be kept negligibly small and it is opposite in sign from that which can be introduced by way of an overall so-called "flash" or "fog" exposure. It is in general not detrimental, and actually helpful in reducing opposite characteristics inherent in certain photographic processes. Since in this type of printer the contrast of the print can be continuously controlled through a wide range by optical adjustment, at any time during the printing operation, such control can be applied to the printing of a long roll of film requiring changes from scene-to-scene or even within the same scene according to the nature of the records at hand and the desired print. Moreover, reasonable variations in the inherent contrast of the positive film stock can be corrected from roll to roll eliminating wasteful and costly rejections.

It will be understood that light source L2 alone, with reflectors B1 and B2, could be used if continuous contrast control is not required but if it is desired merely to double the contrast.

The simple embodiment of a contrast control device shown in Fig. 1, while operative and useful for certain purposes has disadvantages such as surface reflection at the negative N causing the final image of beam b2 to contain light reflected by the negative surface itself without ever passing through N and therefore equivalent to an overall fogging illumination of the raw film A. Somewhat more elaborate embodiments such as now to be described avoid these defects and have additional advantages.

In Fig. 4, L1 and L2 are again conventional incandescent lamps the emission of which can be regulated by means of appropriate provisions such as rheostats or shuttering devices. B3 and B4 are semi-transparent reflectors. B3 is arranged between negative film N (in a gate which is not shown) and the front component Cf11 of a field lens Cf1. Transparent reflector B4, within a conventional cubical prism Cp, is mounted between the rear element Cf12 of the field lens, and the copying objective Co1. The field lens Cf1 receives its illumination from a condenser lens Cc1 and a relay lens Cr1. A conventional quarter wave plate Wq1 is placed between relay lens Cr1 and field lens Cf1. A second quarter wave plate Wq2 is arranged between reflector B3 and film N. Reflector B3 can be coated directly on the quarter wave plate Wq2 or on the flat of lens Cf11.

The quarter wave plate Wq1, and the plate Wq2 with transparent reflector B3 are fastened to mounts Q1 and Q3 respectively, which can be independently rotatable or, as shown in Fig. 4, connected by a gear train comprising a shaft 30, two gear wheels 31 and 32 which engage correspondingly toothed rims of mounts Q1 and Q3, and a knob 35 for rotating the gears and mounts. It will be noted that the components Cf11 and Cf12 of field lens Cf1 are on either side of the three element pack B3, Wq2 and N, so that these elements operate in collimated light. Light source L2 is provided with a condenser lens Cc2 and a relay lens Cr2, which system corresponds to lens combination Cc1, Cr1 associated with light source L1. A polarizing element, for example a calcite prism or a sheet polarizer P1 is interposed between lenses Cc1 and Cr1. An additional polarizing element P2 is interposed between Cc2 and Cr2, and a third polarizing element P3 is arranged between copying lens Co1 and positive film A confined in a suitable film gate.

With P1 oriented to polarize the light from L1 in the vertical plane (indicated by a dot at P), with the light from source L2 polarized horizontally (indicated by an arrow) by P2, and with P3 likewise oriented in the vertical plane, no light from L2 could reach the film A. This light path is however modified by the quarter wave plate Wq2 between reflector B3 and film N, which plate if properly oriented as well known in the art, converts plane polarized light into circularly polarized light which, upon again passing plate Wq2 is converted into light polarized in a plane at 90° to its original plane of polarization. Thus, the b2 beam, horizontally polarized at P2, after being reflected at B4 passes negative N, passes plate Wq2 which circularly polarizes it, is reflected at B3, again passes quarter wave plate Wq2 where it is reconverted into plane polarized light at 90° to its original plane thus emerging vertically polarized, again traverses N, is passed by P3 with the latter in the above mentioned vertically polarizing position, and is imaged on the positive film A at approximately twice the contrast of N.

Beam b1 can be extinguished, as indicated in Fig. 5, by orienting plate Wq2 so that it reconverts the beam b1, emerging circularly polarized from plate Wq1, into light polarized in the horizontal plane before it reaches vertically oriented plate P2 where it is extinguished. It will be noted that beam b2 is not affected by this adjustment, its twice passing through plate Wq2 rendering it vertically polarized so that it passes polarizer P3.

In order to extinguish beam b2 without affecting b1, as indicated in Fig. 6, plate Wq2 is positioned so as not to rotate beam b2 which thus emerges horizontally polarized from N and is extinguished at P3. Plate Wq1 can be positioned so as to counteract the rotating effect of $Wq2$ and to leave $b1$ vertically polarized so that it passes P3 and is imaged on film A.

Intermediate contrast values can be obtained in several ways. The intensity of the beam $b1$ can be varied by rotating the quarter wave plate $Wq1$, and beam $b2$ can be similarly controlled by rotating the quarter wave plate $Wq2$. Instead, the copying light intensity can be varied by regulating the light source emission with rheostats or by inserting non-polarizing filters or shutters in the beams. Plates P1 and $Wq1$ can then be omitted.

It will be observed that the remaining elements P2, P3 and $Wq2$ prevent the above mentioned detrimental surface reflection since that portion of the horizontally polarized beam $b2$ which is directly reflected at N, is eliminated at P3 and thus unable to add detrimental overall exposure of film A.

The arrangement according to Fig. 4 permits contrast control without change of exposure, by means of a single setting using knob 35 and the above described gear connection between plates $Wq1$ and $Wq2$, provided that the maximum brightness of the two images is balanced. This condition is fulfilled if B3 reflects two-thirds of the light incident thereon and B4 reflects fifty percent of such light. Thus ascribing to the intensity at L1 the unit value 6/6, the intensity will be 2/6 behind B3, and 1/6 behind B4. Similarly assuming that the intensity of L2 is 6/6, it will be 3/6 between B4 and B3, and likewise 1/6 behind B4. If knob 35 is now operated, this ratio of beam intensity will change and the contrast accordingly, as discussed above with reference to Fig. 2.

In the arrangement according to Fig. 4 the mirror B3 cannot be placed directly in contact with negative film N because of the necessity of placing the quarter wave plate $Wq2$ therebetween, although the separation can be decreased by evaporation coating the transparent reflector on the back of the quarter wave plate. For reasons of proper registration, this arrangement makes it desirable to use essentially collimated light at this region. As mentioned above, this is accomplished by placing relay lens $Cr1$ and copy lens $C1$ at equal distances from negative film N, and by dividing the power of the field lens $Cf1$ into two equal plano-convex elements $Cf11$ and $Cf12$ on either side of the pack B3, $Wq2$, N. This registration problem can be altogether avoided by eliminating B3 and $Wq2$ from the negative film region, for example as shown in Figs. 7 to 9.

As indicated by corresponding identification marks, the device according to Fig. 7 is a good deal similar to that shown and described with reference to Fig. 4. It differs in that the transmitting reflector and the quarter wave plate are omitted from field lens system $Cf1$. Instead, a photographic objective $Co2$ and a triple mirror, cube-corner auto-collimator $Ca$ are introduced, together with a second light dividing prism $Cp2$ with transmitting reflector B5. Light source L3 with a condenser lens $Cc3$, a relay lens $Cr3$, and a rotatable polarizing element P4 replaces source L1 of Fig. 4. A quarter wave plate $Wq3$ is inserted between lens system $Co2$ and prism $Ca$. This polarizer P4 and the quarter wave plate $Wq3$ can be independently rotatable or P4 and $Wq3$ may be mechanically coupled such as by way of a gear train 40 with gear wheels 41, 42, 43, 44, shafts 45 and 46 and hand wheel 47. Gear wheels 41 and 42 engage geared rims 48 and 49 of mounts for quarter wave plate $Wq3$ and polarize P4 respectively, so that the two plates can be rotated together by operating knob 47.

In this embodiment, the beam $b2$ is optically imaged back upon itself at the negative N by means of the system $Co2$, $Ca$, as indicated in Figs. 8 and 9. Thus, the quarter wave plate is entirely removed from the once-through beam, here $b3$, which can be modulated by rotating P4. It will be evident that $b3$, furnished by lamp L3, is inserted into the ray train by means of reflector B5.

It will be noted that the system $Co2$, $Ca$ constitutes a constant deviation arrangement so that, when the twice through image is in focus on the negative N, it is also automatically in register and correctly magnified.

The transmission-reflection ratios of the two beam splitters B4 and B5, for balanced maximum image brightness, are 50/50 for B4 and 73/27 for B5.

In order to hold the exposure constant while continuously varying the contrast by means of knob 47, polarizer P4 and quarter wave plate $Wq3$ have to be geared at a two to one ratio, for reasons which will now be evident from the above discussion of the system according to Fig. 4. Again, intermediate contrast values can also be obtained by controlling the lamp voltages, or by means of neutral density wedges or shutters.

Figs. 8 and 9 indicate the conditions for complete elimination of beam $b1$ and $b2$, respectively, and will now be understood without further explanation, by referring to the above discussion of Figs. 5 and 6, remembering that $Wq3$ takes the place of $Wq2$ of Fig. 4, and P4 assumes the function of P1 and $Wq1$.

In the previously discussed embodiments, the twice through beam is passed through the negative twice in opposite directions. This may sometimes have certain disadvantages based on the difference in optical reflection and scattering characteristics of the two sides of the emulsion. Such disadvantages can be overcome by passing the beam through the negative twice in the same direction. Such a system will now be described with reference to Figs. 10 to 12.

The embodiment according to Fig. 10 has a straight beam $b5$ originating at light source L5 which illuminates negative film N by means of a condenser $Cc5$ and a relay lens $Cr5$. The records of negative film N are projected on raw film A with the aid of a field lens system $Cf5$ and an objective $Co5$. Interposed in the undeviated light path between lamp L5 and positive film A are further a polarizing system P5, a prism system $Cp5$ with transmitting reflector B5, a second transmitting reflector system $Cp6$, B6, and second polarizer P6. Polarizer P5 is fixed, whereas P6 is rotatable. In a deflected light path, light is directed by transparent reflector B6 towards the other transparent reflector B5, by way of an objective lens $Co6$, a reflector B7, a field lens $Cf6$, another reflector B8, and another objective lens system $Co7$. A half wave retardation plate $Wh1$ is interposed in the deflected beam.

This system provides superimposition of two copying images by means of a single light source, namely L5, as follows. It will first be assumed that the device is set for one of the two extreme possibilities, for example maximum contrast. This condition is schematically illustrated in Fig. 11 as follows. The light beam $b5$ from the lamp L5 is polarized in one, for example the vertical, plane at P5, passes through beam splitter B5, has impressed thereon the record of N, passes the second beam splitter B6 and is wholly absorbed in the second polarizer P6 which is set for horizontal polarization. It may be assumed that both beam splitters reflect 50 percent and transmit the other 50 percent of the incident light. That part of the light flux which reaches B6 is there reflected towards B7 and imaged by objective lens $Co6$ at field lens $Cf6$ in path $b6$. The image at $Cf6$ is reformed on the negative N by way of reflector B8, objective lens $Co7$, and reflector B5. It will be noted that, due to the two objective lens systems, the image of N is erected on its return path and properly oriented to coincide with the negative proper. Needless to say, alignment, focus and magnification must be carefully adjusted throughout the light path. The focal lengths of $Co6$ and $Co7$ are equal, and also the focal lengths of field lens systems $Cf5$ and $Cf6$. The objectives $Co6$ and $Co7$ are thoroughly corrected for operation at one to one magnification. The deviated beam $b6$ is, it will be remembered, vertically polarized by P5. The half wave plate $Wh1$ is oriented with its optic axis at 45° to the vertical, so that this retardation plate rotates the plane of polarization of beam $b6$ from vertical to horizontal orientation. Thus, after being reflected into the straight beam $b5$ at B5, beam $b6$ is horizontally polarized and passes the horizontally oriented polarizer P6, to be imaged at A. This image at A has twice the original contrast of N, since it is composed only of the twice through image carried by $b6$.

The contrast may be reduced continuously from twice gamma to once gamma by rotating the polarizing plate P6 through 90 degrees. In this position it absorbs the twice through beam $b6$ but passes the once through beam $b5$, as indicated in Fig. 12. Neglecting surface reflection losses, the clear aperture illumination at the positive A is in this position four times that achieved in the twice through or maximum contrast position according to Fig. 11, the illumination varying in accordance with the relation $E_\theta = \frac{1}{4} E_o (3 \cos^2 \theta + 1)$ wherein $\theta$ is the angle between the optic axes of polarizers P5 and P6 which may vary between 0 and 90°, and $E_\theta$ and $E_o$ are the respective illuminations.

This nonlinear relation can be compensated for by coordinating with the position of polarizer P6 either the exposure time or lamp intensity, or by using neutral density filters, wedges or similar expedients.

The particular feature of systems according to Fig. 10, namely the total separation of once through and twice through beams through large parts of their paths has auxiliary advantages, such as the possibility of inserting color filters in one of the beams for individual control of the contrast of different color components in a process where all colors are printed simultaneously from a colored record N. For example during the printing of a negative in complementary colors with light of three ranges to which three layers of the raw film A are selectively sensitive, the contrast of two groups of colors can be independently regulated by placing in beam $b6$ filter means such as indicated at Uc of Figs. 10 and 14, which differentiate these groups.

Fig. 13 shows curves which have been derived from prints of a color positive made with a system according to Fig. 10. These curves indicate clearly the gamma adjustment obtainable in accordance with the invention. The curves have been obtained by plotting print densities against the original densities of the transmission gray-scale target negative, exposed under the same conditions as the colored scene. The table accompanying Fig. 13 indicates the relation of gamma values to angles $\theta$ between the axes of plates P5 and P6 which angles determine the ratio between once through and twice through exposures. The once through gamma 1.06, corresponding to $\theta = 0^\circ$ (position of Fig. 12) is that of the process and materials used, due to the above manner of plotting the curves.

The above described embodiments of our invention are somewhat handicapped by the loss of light inherent in polarizer-analyzer systems of the selective absorption types, which systems are moreover sometimes unstable to light and heat intensities of the magnitudes encountered in optical printers. While it is possible to use practically stable double refraction elements such as Nicol prisms, these are very expensive and limited as to size and angular aperture. Moreover, they introduce unsymmetrical distortions of color and field angle. The semi-silvered reflectors used as beam splitters in the above described embodiments also introduce reflection losses. These losses in polarizers and reflectors can be avoided by using polarizing beam splitters of high optical efficiency and excellent stability which can now be made in any desired size. Such beam splitters incorporate multi-layer coatings of selected colorless materials applied to the hypotenuse faces of glass prisms of the well known type indicated in the herein above described figures. Such surfaces polarize each of the two component beams with more than 98 percent complete polarization over a very broad spectral range, the beam leaving the cube being polarized in planes normal to each other. Beam splitting polarizers of this type are for example described in an article by Mary Banning, entitled "Practical Methods of Making and Using Multilayer Filters," Journal of the Optical Society of America, vol. 37, pages 792 to 797, October 1947. Such beam splitting polarizers can be applied to systems of the above described type, in a manner which will be evident from the following description of a modification of our device according to Fig. 10.

The system according to Fig. 14 which is in many respects quite similar to that of Fig. 10, comprises a lamp L5, a condenser Cc5, a relay lens Cr5, a field lens Cf5 at negative N, and an objective Co5 projecting an image of N on raw stock A. In the deviated beam are two objectives Co2 and Co3, a field lens Cf6 and two reflectors B7 and B8. The light splitting devices are in this instance polarizing light splitters of the above identified type, indicated at PS1 and PS2 in the place of B5 and B6 of Fig. 10. The system contains in addition a half wave plate W$h$2 which is rotatably mounted in any convenient manner. The polarizing beam splitter PS1 is so oriented that light from the lamp house entering PS1 becomes polarized in the horizontal plane with the vertical component being lost, as indicated in Fig. 15. The polarizing beam splitter PS2 is so arranged that it transmits only substantially horizontally polarized and reflects only substantially vertically polarized light. Hence, as likewise indicated in Fig. 15, PS2 passes the entire horizontal component but does not reflect any such light, so that the device behaves in this setting as a conventional optical printer, with the contrast of the image at A having the normal relation to the contrast of the negative N. The efficiency of this system is approximately 50 percent due to the 50 percent loss of PS1.

In order to obtain a twice through beam the half wave plate W$h$2 is used which, it will be noted, is in the path of both direct and diverted beams, as distinguished from the position in a single beam, of the rotating plate of Fig. 10. With the optic axis of plate W$h$2 horizontal, that is parallel to the plane of polarization of the entering beam, the latter is undisturbed and the condition indicated in Fig. 15, namely that with only the direct beam effective is not disturbed. If, however, the half wave plate W$h$2 is rotated 45°, the plane of polarization of the beam is rotated 90°. The beam enters PS2 vertically polarized as indicated in Fig. 16, it is totally reflected at PS2 and traverses a complete loop through Co2, B7, Cf6, B8, Co3 and is again totally reflected back to N by PS1. The deviated beam $b6$ enters W$h$2 still vertically polarized, is again rotated, passes the negative and, being now horizontally polarized is totally transmitted by P$s$2. All light imaged on A has passed through the negative twice, the beam $b5$ being stopped at PS2. The only substantial loss occurs upon the first reflection at PS1, the efficiency being again 50 percent.

At positions intermediate those shown in Figs. 15 and 16, respectively, the half wave plate W$h$2 transmits both vertically and horizontally polarized components so that part of the original beam leaves the system directly without having been deviated thus providing an image with normal or once-through contrast correspondence between negative and positive, whereas another part is reflected at PS2 and passes through the negative twice thus effecting a twice through contrast relation. The ratio of light flux components carrying once through and twice through contrast images is thus continuously variable corresponding to the infinite number of possible positions of half wave plate W$h$2.

It will now be evident that the respective intensities of the beams of Fig. 14 can also be adjusted by means of shutters and filters.

Instead of accomplishing the above described multiple passage through a negative by the same light beam by means of reflection with or without the aid of discrimination of planes of polarization, this effect can also be obtained by way of discrimination on the basis of wave length differences. Such an embodiment will now be described with reference to Fig. 17.

In its overall arrangement, the device according to Fig. 17 is similar to those described with reference to Figs. 1 and 4. A lamp L8 illuminates through a condenser lens Cc8 and a relay lens Cr8, the film N within a field system Cf8. A copying lens system Co8 projects an image of N on the raw or positive film A in an appropriate film gate.

Interposed in front of negative N is a translucent fluorescent screen F dimensioned and selected as to effective phosphor material, in accordance with well known principles, to avoid saturation so that the actinic brightness of its emission varies directly with the incident light intensity. The screen F may either be fixed or take the shape of a fluorescent film strip moving through the printer aperture with the negative N.

Further interposed in the beam of lamp L8 is a transparent reflector B8 within a prism Cp8, and a light filter Ut which absorbs ultra-violet light and might therefore be called a minus ultraviolet filter. A second illumination system consists of a light source L9 preferably a gaseous discharge lamp emitting mainly ultra-violet light. This light is focused on N by way of a condenser lens system Cc9, a relay lens Cr9 and the reflector B8. The lens systems Cc9 and Cr9 are preferably of quartz. Interposed between Cc9 and Cr9 is an ultra-violet filter Ua that transmits mainly ultra-violet light as distinguished from filter Ut which absorbs such light.

Since filter Ua absorbs all radiant energy above a certain wave length, no visible light is reflected towards the negative by B8 and by the surface of film N. The transparent filter Ut absorbs any ultra-violet light that might be reflected by B8 so that the only actinic effect on the raw film A due to light source L9 is that of the fluorescence of screen F. Provided that, as mentioned above, this screen F is not saturated, its actinic brightness is directly proportional to the transmission of the negative. The fluorescently emitted light passes back through the negative N and produces a twice through contrast effect at A.

The exposure with normal gamma is obtained by illuminating the translucent screen F from behind with the conventional light source L8. The relative amounts of energy from the two sources are controlled to produce intermediate contrasts, for example by interposing wedge filters or shutters in front of the lamps as indicated at A8, A9.

It will now be apparent that our invention permits purely optical contrast multiplication with the aid of a single image carrying beam which is more than once affected by the record to be copied, as well as continuous contrast control with the aid of more than one beam. It will be further apparent that the invention is not confined to the above described practical embodiments, but that for example several "twice through" beams can be used, that the components of the various embodiments can be otherwise combined for analogous purposes, and that particularly the light dividing as well as polarizing surfaces described with reference to Figs. 14 to 16 can be analogously utilized in other embodiments.

It should be understood that the present disclosure is for the purpose of illustration only and that this invention includes all modifications and equivalents which fall within the scope of the appended claims.

We claim:

1. Photographic apparatus for optically increasing the contrast of a light transmitting record which is projected onto a light sensitive member, comprising a first gate for said record, a second gate for said light sensitive member, means for directing a light beam a plurality of times through said record, which beam directing means includes a partial reflector of the type which polarizes reflected and transmitted light in different planes directing a second light beam a different number of times through the record, and an optical system for imaging the record with both beams on said light sensitive member, whereby continuously adjustable effective density changes are provided which are functions of the respective densities of elementary areas of the record.

2. Apparatus according to claim 1 further including two light sources which are positioned laterally removed from the axis, and wherein the light directing means includes two optical surfaces for directing the light of both sources into said axis.

3. Apparatus according to claim 1 wherein said beam directing means includes an autocollimating prism combined with an objective lens between prism and record, and placed in the axis of said gates for imaging the record in register back on itself.

4. Apparatus according to claim 1 wherein said light directing means is adapted and arranged to pass one of said beams twice through said layer in the same direction.

5. Apparatus according to claim 1 wherein said light directing means includes a fluorescent layer which passes one of said beams and re-emits the other.

6. Apparatus according to claim 1 wherein said beam directing means includes rotatable phase retardation plates inserted in the respective beams, whereby the relative intensity of the two beams can be adjusted by rotating at least one of said plates.

7. Photographic apparatus for optically increasing the contrast of a light transmitting record which is projected onto a light sensitive member, comprising a first gate for said record, a second gate for said light sensitive member, a light source for illuminating one side of said record, an optical system for directing light from said source, once transmitted by and emerging on the other side of said record, a second time through said record, which optical system includes a partial reflector of the type which polarizes reflected and transmitted light in different planes, and a lens system for imaging the record with the twice transmitted light on the light sensitive member whereby effective density changes are provided which are functions of the respective densities of elementary areas of the record.

8. Apparatus according to claim 7 further including means for discriminating between light of different wave lengths, inserted between said light source and said layer, between said layer and said reversing device, and between said layer and said emulsion, said discriminating means being adapted and arranged to differentiate light coming from said reversing device from stray light reflected from said layer, and substantially to absorb said stray light.

9. Apparatus according to claim 8 wherein said discriminating means includes polarizing and polarization rotating means.

10. Apparatus according to claim 7, wherein said optical system includes an autocollimating prism on said other side of said record layer, and an objective lens system arranged between said layer and said prism for projecting an image of said record in register upon said record.

11. Apparatus according to claim 7 wherein said optical system includes a translucent fluorescent layer placed on said other side of said record layer.

12. Apparatus according to claim 7, wherein said optical system includes means for deviating the light that emerges from said record around the record so that the light passes both times through the record in the same direction.

13. Apparatus according to claim 12 wherein said optical system includes two transparent reflectors obliquely arranged on either side of said record gate, and wherein said deviating means includes two mirrors arranged for directing light transmitted by the one reflector and reflected by the second reflector, towards the first reflector for reflection towards said record.

14. Apparatus for photographically printing from a record onto a sensitive emulsion while controlling the contrast of the print on the emulsion, comprising a printing light source; a first gate for said record; a second gate for said emulsion; a lens system for imaging the record on the emulsion; a beam splitting system of the polarizing type between said source and said record gate which system transmits light from the source polarizing it in a given direction and which directs light incident on the side facing the record towards said record; a second beam splitting system of the polarizing type arranged between said gates which system transmits light polarized in said direction while reflecting light polarizing it in a direction inclined to said first direction and which system directs light incident on the side facing the record away from said emulsion; an optical diverting system for directing light reflected by said second system towards said record facing side of the first system; said systems being arranged to transmit a light component directly from said source through said record towards said emulsion, and to transmit and reflect, respectively, a second component towards said emulsion in a loop including said diverting system and passing twice through said record, and to image both components on said emulsion; and a rotatable optical retardation plate placed between said first system and said second gate, for rotating the plane of polarization of light passing therethrough dependent upon its angular relation to said plane: whereby the relative intensities of light passing once through the record and of light passing it twice via said diverting system can be adjusted by rotating said plate.

15. Photographic apparatus for optically increasing the contrast of a light transmitting record which is projected onto a light sensitive member, comprising on an unbroken axis a first gate for said record and a second gate for said light sensitive member, a first light source, a second light source laterally removed from said axis, partial reflector means in said axis for deflecting light from said second source into said axis at a point between said gates, which partial reflector is of the type which polarizes reflected and transmitted light in different planes, means for directing the light of said second source a plurality of times through said record, means for directing the light of said first source a different number of times through said record, an optical system for imaging the record with the light from both sources on said light sensitive member, and separate polarization means in the light from the respective light sources, whereby the relative intensity of the light from the respective sources can be adjusted with the polarization means characteristics to provide continuously adjustable effective density changes which are functions of respective densities of respective record areas.

16. Apparatus according to claim 15 wherein said first light source is located substantially in said unbroken axis.

17. Apparatus according to claim 15 wherein said polarizing means includes a polarizer for each light source respectively, a rotatable quarter wave plate between said first source and said light directing means, and a second rotatable quarter wave plate within said light directing means.

18. Apparatus according to claim 17 wherein said rotatable quarter wave plates are mechanically coupled.

19. Apparatus according to claim 15 wherein said first light source is likewise laterally removed from said axis, and said light directing means includes total reflecting means for directing light from said second source which emerges from said record back to the record, and between the record and said total reflector a partial reflector for deflecting light from said first source into said axis.

20. Apparatus according to claim 19 wherein said polarizing means includes a polarizer for said second light source, a rotatable polarizer for said first source, and a rotatable quarter wave plate for the light from said first source located in front of said total reflecting means.

21. Apparatus according to claim 20 wherein said rotatable polarizer and said rotatable quarter wave plate are mechanically coupled.

22. Apparatus for photographically printing from a record onto a sensitive emulsion while controlling the contrast of the print on the emulsion, comprising a printing light source; a first gate for said record; a second gate for said emulsion; a lens system for imaging the record on the emulsion; a beam splitting system between said source and said record gate which system transmits light and reflects light incident on the side facing the record towards said record; a second beam splitting system arranged between said gates which system transmits light and reflects light incident on the side facing the record towards said record; an optical diverting system for directing light reflected by said second system towards said record facing surface of said first system; said systems being arranged to transmit a first light component directly from said source through said record towards said emulsion, and to transmit and reflect, respectively, a second component towards said emulsion in a loop including said diverting system and passing twice through said record, and to image both components on said emulsion; and light polarizing means associated with said systems for polarizing said light components in respective planes that are inclined to each other, such as to distinguish between the component passing said record once from that passing it twice; whereby said contrast can be controlled by selective intensity adjustment of the light components.

23. Apparatus for photographically printing from a record onto a sensitive emulsion while controlling the contrast of the print on the emulsion, comprising a printing light source; a first gate for said record; a second gate for said emulsion; a lens system for imaging the record on the emulsion; a beam splitting system between said source and said record gate which system transmits light and reflects light incident on the side facing the record towards said record; a second beam splitting system arranged between said gates which system transmits light and reflects light incident on the side facing the record towards said record; an optical diverting system for directing light reflected by said second system towards said record facing surface of said first system; said systems being arranged to transmit a first light component directly from said source through said record towards said emulsion, and to transmit and reflect, respectively, a second compartment towards said emulsion in a loop including said riverting system and passing twice through said record, and to image both components on said emulsion; and color filter means associated with said systems for restricting at least one of said light components to a spectral range, such as to distinguish between the component passing said record once from that passing it twice; whereby said contrast can be controlled by selective intensity adjustment of the light components.

References Cited in the file of this patent

UNITED STATES PATENTS

| | | |
|---|---|---|
| 603,936 | Bouvang | May 10, 1898 |
| 1,959,498 | Planskoy | May 22, 1934 |
| 2,131,501 | Dimmick | Sept. 27, 1938 |
| 2,152,353 | Levin | Mar. 28, 1939 |
| 2,480,423 | Simon | Aug. 30, 1949 |
| 2,480,425 | Simon | Aug. 30, 1949 |
| 2,501,446 | Justice | Mar. 21, 1950 |
| 2,543,706 | Pohl | Feb. 27, 1951 |
| 2,641,963 | Carter | June 16, 1953 |

FOREIGN PATENTS

| | | |
|---|---|---|
| 1,000,994 | France | Oct. 17, 1951 |